United States Patent [19]

Zierhut

[11] Patent Number: 5,153,448
[45] Date of Patent: Oct. 6, 1992

[54] INFORMATION SEPARATION DEVICE

[75] Inventor: Hermann Zierhut, Munich, Fed. Rep. of Germany

[73] Assignee: Siemens Aktiengesellschaft, Berlin and Munich, Fed. Rep. of Germany

[21] Appl. No.: 465,946

[22] Filed: Jan. 16, 1990

[30] Foreign Application Priority Data

Jan. 27, 1989 [EP] European Pat. Off. ........ 89101453.2

[51] Int. Cl.$^5$ .............................................. H04B 3/54
[52] U.S. Cl. .......................................... 307/1; 307/2; 307/4; 340/310 R; 340/310 A
[58] Field of Search ........ 340/310 R, 310 CP, 310 A; 307/1, 2, 4

[56] References Cited

U.S. PATENT DOCUMENTS

| | | | |
|---|---|---|---|
| 3,312,875 | 4/1967 | Mayer | 340/310 R |
| 3,384,810 | 5/1968 | Kelsey | 340/310 R |
| 3,971,010 | 7/1976 | Foehn | 340/310 R |
| 4,371,867 | 2/1983 | Gander | 340/310 R |
| 4,703,190 | 10/1987 | Tamura et al. | 307/2 |

FOREIGN PATENT DOCUMENTS

| | | | |
|---|---|---|---|
| 1213452 | 4/1960 | France | 340/310 R |
| 46-37535 | 11/1971 | Japan | 340/310 R |

Primary Examiner—R. Skudy
Assistant Examiner—Thomas M. Dougherty
Attorney, Agent, or Firm—Kenyon & Kenyon

[57] ABSTRACT

An information separation device that having a transformer operating as a separating filter to separate alternating voltage information and transmitted direct current power. The transformer has at least one winding on a first side coupled to the dc power. A capacitor is coupled to this winding, at whose ends direct current power is made available. The transformer has one winding on an information processing side. First and second valves are arranged in a transmitting branch parallel to the capacitor, the second winding being coupled at its first end between the first and second valves. Third and fourth valves are arranged in a branch parallel to the capacitor, the second winding being coupled in series at its first and second ends between the third and fourth valves in phase opposition to the first and second valves.

8 Claims, 1 Drawing Sheet

INFORMATION SEPARATION DEVICE

FIELD INFORMATION SEPARATION DEVICE

The present invention relates to an information separation device which has a transformer operating as a separating filter to separate transmitted alternating voltage information signals from direct current power. The information separation device has at least one winding on the side blocking direct current with a storage capacitor being serially coupled to the winding.

BACKGROUND OF THE INVENTION

Bus systems are known having various designs and implementing various types of transmission (see DE-A-3 631 477). In bus systems, digital data can be transmitted for measuring or controlling or analog signals can be transmitted. Bus systems are also suitable for voice transmission, as is discussed in European Patent Application EP 88117678.8.

There are known systems that have stations which can either process data or operate sensors, wiring accessories or motor-driven equipment like venetian blinds. These stations are coupled to a bus via a bus-coupler. The systems are designed either in a centralized or decentralized manner. Either digital data or analog signals can be transmitted over the bus for measuring or controlling the signals. In addition to the information, i.e., messages, sent to the stations, power for the electrical apparatus of the system is also supplied via the bus-coupler. In addition, the power available to the end user is also to be supplied to energy consumers such as motors, lights or heating devices.

The interplay between the bus and the bus-couplers, the number of required transmission paths as well as the type and operation of the devices effect the economic efficiency of a bus system. There is a need for an information separation device that operates especially economically.

SUMMARY OF THE INVENTION

This and other needs are met by the present invention which provides an information separation device having a transformer operating as a separating filter separating transmitted alternating voltage information from direct current power. The transformer has a first side and a second side, the first side having at least one first winding and a capacitor coupled in series to the first winding, this capacitor blocking direct current. The second side of the transformer has a second winding with first and second ends and processes received separated information. First and second transisters are arranged parallel to the storage capacitor in a transmitting branch, with the second winding being coupled at its firs between the first and second transisters first and second diodes are arranged in a branch parallel to the storage capacitor, the second winding being coupled in series between the first and second diodes in phase opposition to the first and second transistors in the transmitting branch.

In this manner, power stored in the second winding can be recovered and brought to the other side of the transformer, whereby the transformer is bypassed. With this method of energy transport, the transformer is relieved so that it can be more compactly and economically designed and allow the point of operation to be more favorable.

In prior systems, separate individual windings would be necessary for transmission and for power recovery. In the present invention, one winding is used for both functions.

According to an embodiment of the present invention, one of the transistors in the transmitting branch is controlled to be conductive for standby receiving during breaks in transmission while the other is kept in the blocking state, and the receiving signal is picked off from the end of the second winding to which the conductively-controlled transistors valve is not coupled. With this type of information separation device, the single winding used for transmission and power recovery is also used for the reception of signals. Usually, an additional individual winding is needed for this purpose. Instead, the device according to the present invention for the transmission and reception of signals with simultaneous power recovery from the winding does this with a single winding. The information separation device of the present invention is therefore suited for the transmission of messages and for the transmission of power on a common line, especially for a two-conductor bus. However, other transmission paths and systems are also usable with the present invention.

DETAILED DESCRIPTION

Figure 1:
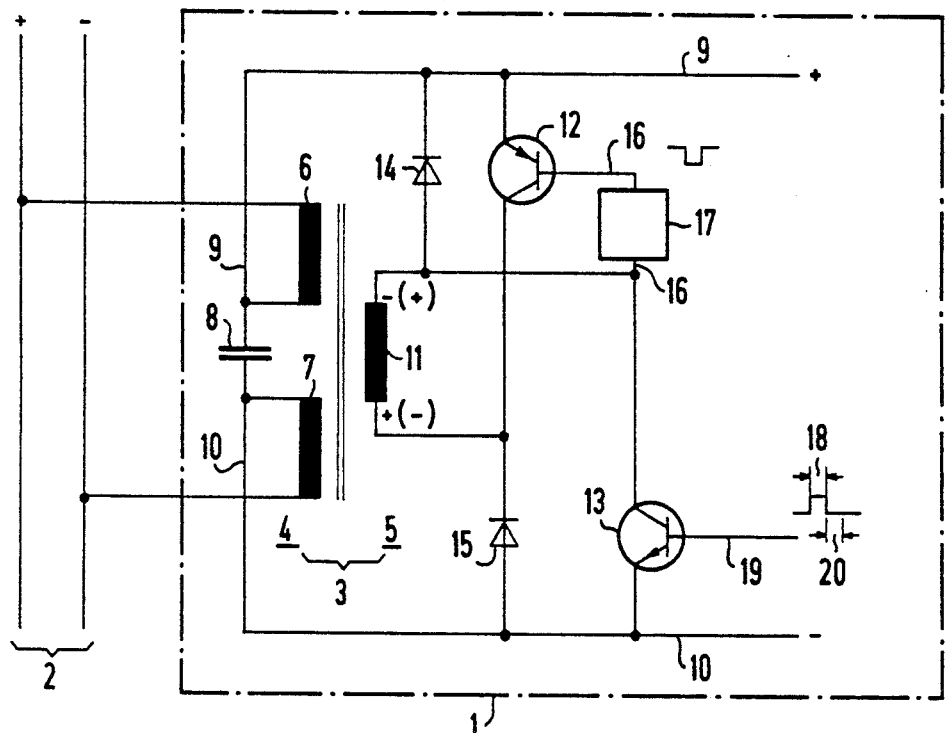
FIG. 1 shows a circuit of an information separation device constructed in accordance with an embodiment of the present invention.

An embodiment of an information separation device 1 is shown coupled to a bus 2 in FIG. 1. This bus 2 also carries direct current for the supply of the electrical apparatus systems of the station 1 and additional information separation devices that can also be coupled in parallel on the bus 2. The bus 2 also carries alternating voltage information signals for the communication traffic. The information separation device 1 has a transformer 3 operating as a separating filter to separate transmitted alternating voltage information from direct current power. On the side 4 of the transformer 3 which is connected to the direct current power, there are two windings 6 and 7 for reasons of symmetry. A capacitor 8 is arranged in series between these windings 6, 7. This capacitor 8 acts as a conductor for information signals received. At the connection lines 9 and 10 of the capacitor 8, dc voltage is held in reserve for the power supplying of the information separation device 1.

The transformer 3 has one winding 11 on its information processing side 5. Two transistors 12 and 13 and two diodes 14 and 15 are provided on this information processing side 5. Two transistors 12, 13 are coupled, in parallel to the capacitor 8 in a transmitting branch. Two diodes 14, 15 are arranged in an additional branch that is also parallel to the capacitor 8. The winding 11 is arranged in series between the val 14, 15. One end of the winding 11 is also coupled between diodes 12, 13 and the other end between transistors 12, 15. The winding 11 is switched on by the diodes 14 and 15 in phase opposition to the transistors 12 and 13 in the transmitting branch.

When the capacitor 8 has a suitable capacity, i.e., is designed as a storage capacitor, it can, in the event of short, external voltage interruptions. be bridged.

A connecting line 16 runs from a control electrode of the transistors 12 via a two-terminal coupling network 17 to the transmitting branch containing the transistors 12 and 13. The two-terminal coupling network 17 can be, for example, an ohmic resistor or an RC-element. The two-terminal coupling network provides a negative control voltage on the control electrode of transistor 12, which is a pnp-transistor in FIG. 1, when a positive transmission signal is present on the control electrode of transistor 13, which is an npn-transistor in FIG. 1, whereby both transistors 12 and 13 become conductive.

When a positive transmission signal 18 is present on the transmission control line 19, the transistor 13 becomes conductive so that negative potential reaches the control electrode of the transistor 12, whereby a positive flow of current flows from the capacitor 8 via the connection line 9, the transits 12, the winding 11 of the transformer on the information-processing side 5, over the transister 13 and the connection line 10 back to the negative potential side of the capacitor 8. As oriented in the FIG. 1, the winding 11 has the plus voltage on bottom and the minus voltage on top. During the break in transmission 20, a recovery of power takes place.

As a result of the magnetic lag caused by the winding 11 and its reversal of polarity at the end of the transmission signal 18, a relatively high positive spike and a corresponding negative spike are present on the winding 11. For the recovery of power at the end of the transmission signal 18 a positive flow of current then takes place across the diode 14 via the connection line 9 through the storage capacitor 8 and via, the connection 10 of the storage capacitor 8 across the diode 15 back to the winding 11 of the transformer 3. By this means, power is carried back past the transformer 3 to the storage capacitor 8, which is available again (via connections 9 and 10) to act as the power supply for the information separation device 1.

Figure 2:
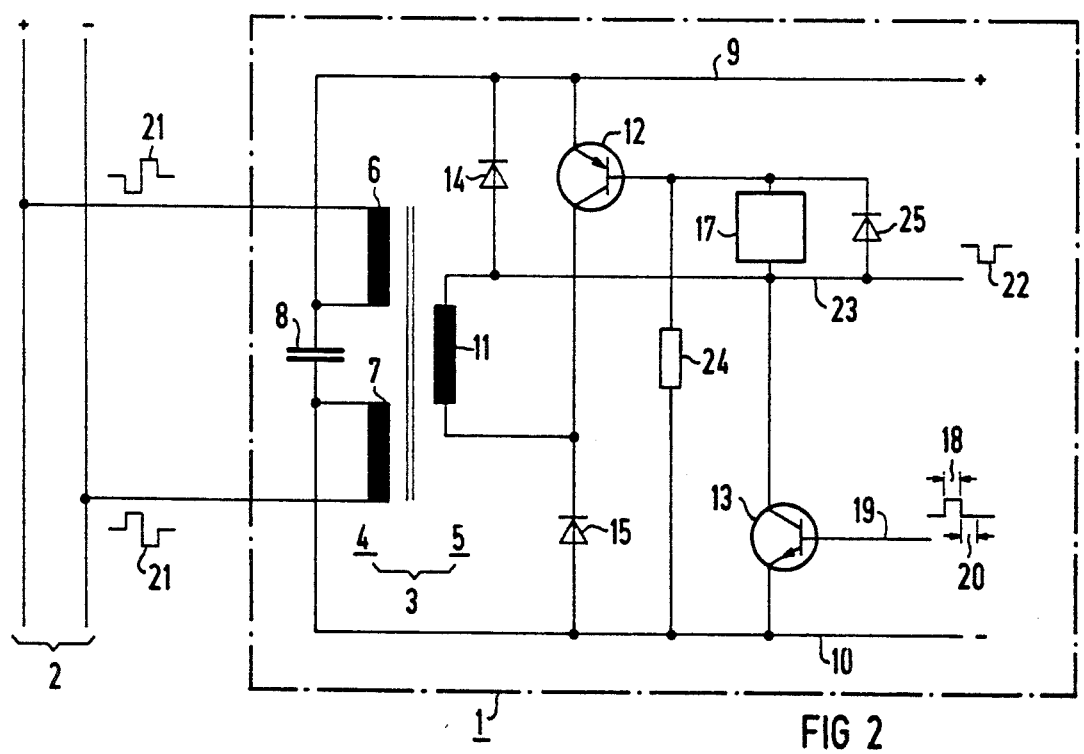
FIG. 2 shows a circuit of an information separation device constructed in accordance with another embodiment of the present invention.

FIG. 2 shows another embodiment of the information separation device 1 in which receiving- signals 21, illustrated as symmetrical alternating voltage signals, arriving over the bus 2 can be evaluated with the winding 11 of the transformer on the information processing side 5. For this purpose, one of the transistors 12, 13 in the transmitting branch is controlled to become conductive for standby receiving during breaks in transmission 20, while the other of the transistors 12, 13 remains in the blocking state. In the embodiment of FIG. 2, the valve 12 becomes conductive for reception while transistor 13 remains blocked during breaks in transmission 20. The receiving signal 22 in the information separation device 1 is taken off of the end of the winding on the information processing side 5 of the transformer 3 via a receiving line 23, to which end the conductively-controlled valve 12 is not connected.

In order to conductively control the valve 12 for standby receiving during breaks in transmission 20, negative control voltage for the pnp-transistor, transistor 12, is applied via a resistor 24 that is also coup at its other end to the control electrode of the transistor 12 via a diode 25, oriented so that the relatively high positive potential on the upper connection of the winding 11 is supplied to the control electrode in the phase for power recovery, so that the transistor 12 is reliably blocked. The receiving signals 21 from the bus 2 lead to a negative receiving signal 22 in the information separation device 1 on the secondary side of the transformer 3 on the receiving line 23.

In this manner, for a bus that transmit power and messages over one line, transmission signals can be evaluated with one winding on the information processing side of a transformer, to carry out the recovery of power and to process information signals.

What is claimed is:

1. An information separation device comprising:
    a transformer which separates transmitted alternating voltage information rom direct current power, the transformer having a first side and a second side, said first side having at least one winding and a capacitor coupled in series to said winding, said capacitor blocking direct current; said second side of said transformer having a winding with first and second ends and processing received separated information;
    first and second transistors arranged in a transmitting branch parallel to said capacitor, said winding of said second side of said transformer being coupled at its first end at a point between said first and second transistors;
    first and second diodes arranged in a branch parallel to said capacitor, said winding of said second side of said transformer being coupled in series at its first and second ends between said first and second diodes in phase opposition to the first and second transistors.

2. The information separation device of claim 1, wherein one of said first and second transistors is controllable to become conductive for standby receiving during breaks in transmission, and the other of said first and second transistors is controllable to be kept in a blocking state, and further comprising means for picking off a receiving signal from the first end of said winding of said second side of said transformer.

3. An information separation device comprising:
    a means for separating transmitted alternating voltage from direct current, said means for separating has a first side and a second side;
    at least one winding, located at said first side of said means for separating;
    a means for blocking direct current, connected in series with said winding;
    a means for storing power, located at said second side of said means for separating and having a first and a second terminal;
    a first means for switching, having an on state providing a positive voltage at said first terminal of said means for storing power and a negative voltage at said second terminal of said means for storing power;
    a second means for switching, having an on state providing a positive voltage at said second terminal of said means for storing power and a negative voltage to said first terminal of said means for storing power;
    wherein said fist means for switching is on and said second means for switching is off during a break in a transmission and said first means for switching if off and said second means for switching is on when a positive transmission signal is present.

4. An information storage device according to claim 3 wherein
    said means for separating comprises a transformer.

5. An information storage device according to claim 3 wherein
    said means for storing power is a winding.

6. An information storage device according to claim 5 wherein
said means for blocking direct current is a capacitor.

7. An information storage device according to claim 5 wherein
said first means for switching includes diodes.

8. An information storage device according to claim 5 wherein
said second means for switching includes transistors.

* * * * *